March 6, 1962     W. R. LONG     3,023,881
GRAIN ELEVATOR

Filed Aug. 26, 1959     4 Sheets-Sheet 1

INVENTOR
W. R. Long
BY
ATTORNEY

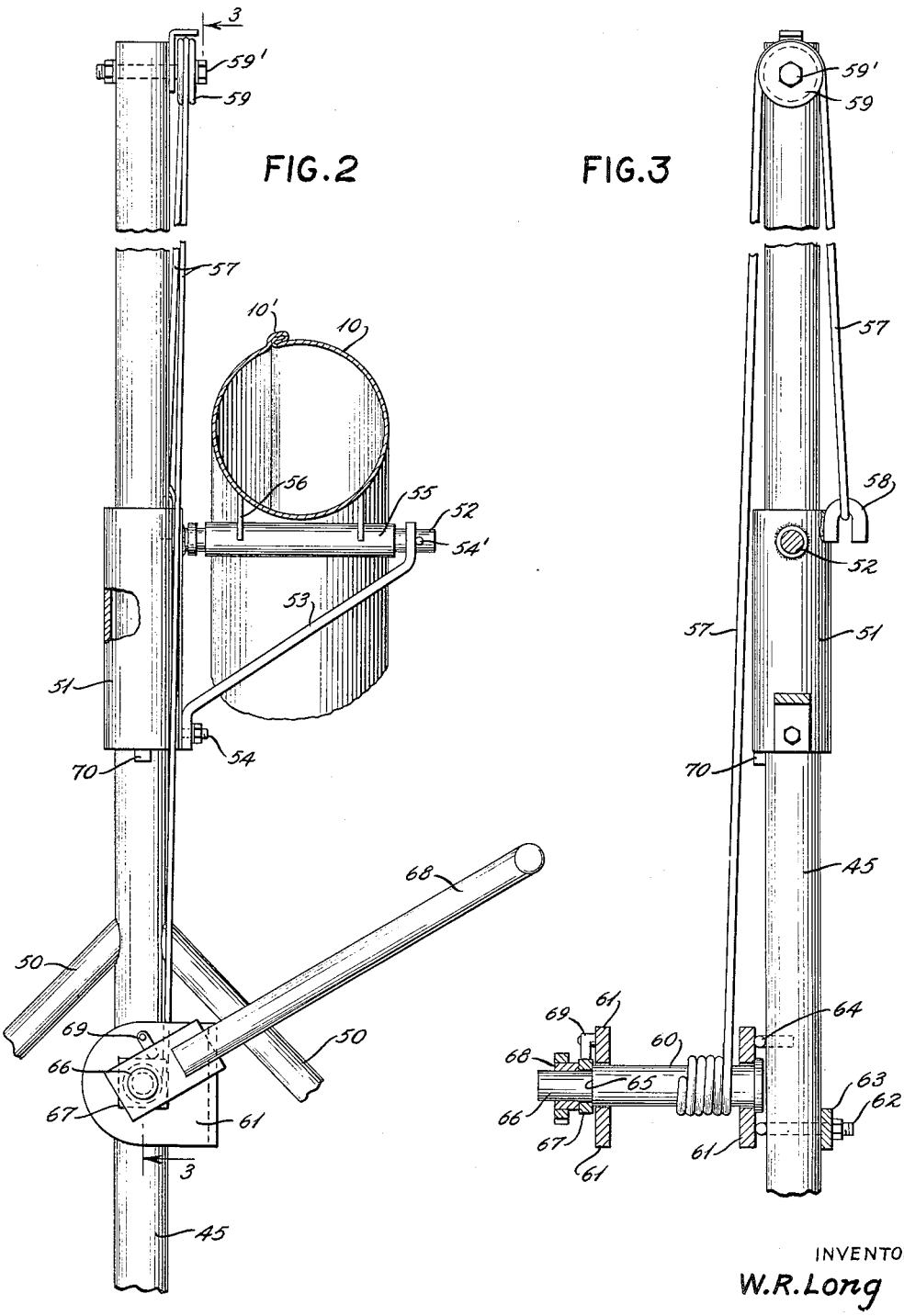

March 6, 1962 W. R. LONG 3,023,881
GRAIN ELEVATOR

Filed Aug. 26, 1959 4 Sheets-Sheet 3

INVENTOR
W. R. Long
BY
ATTORNEY

March 6, 1962 W. R. LONG 3,023,881
GRAIN ELEVATOR
Filed Aug. 26, 1959 4 Sheets-Sheet 4
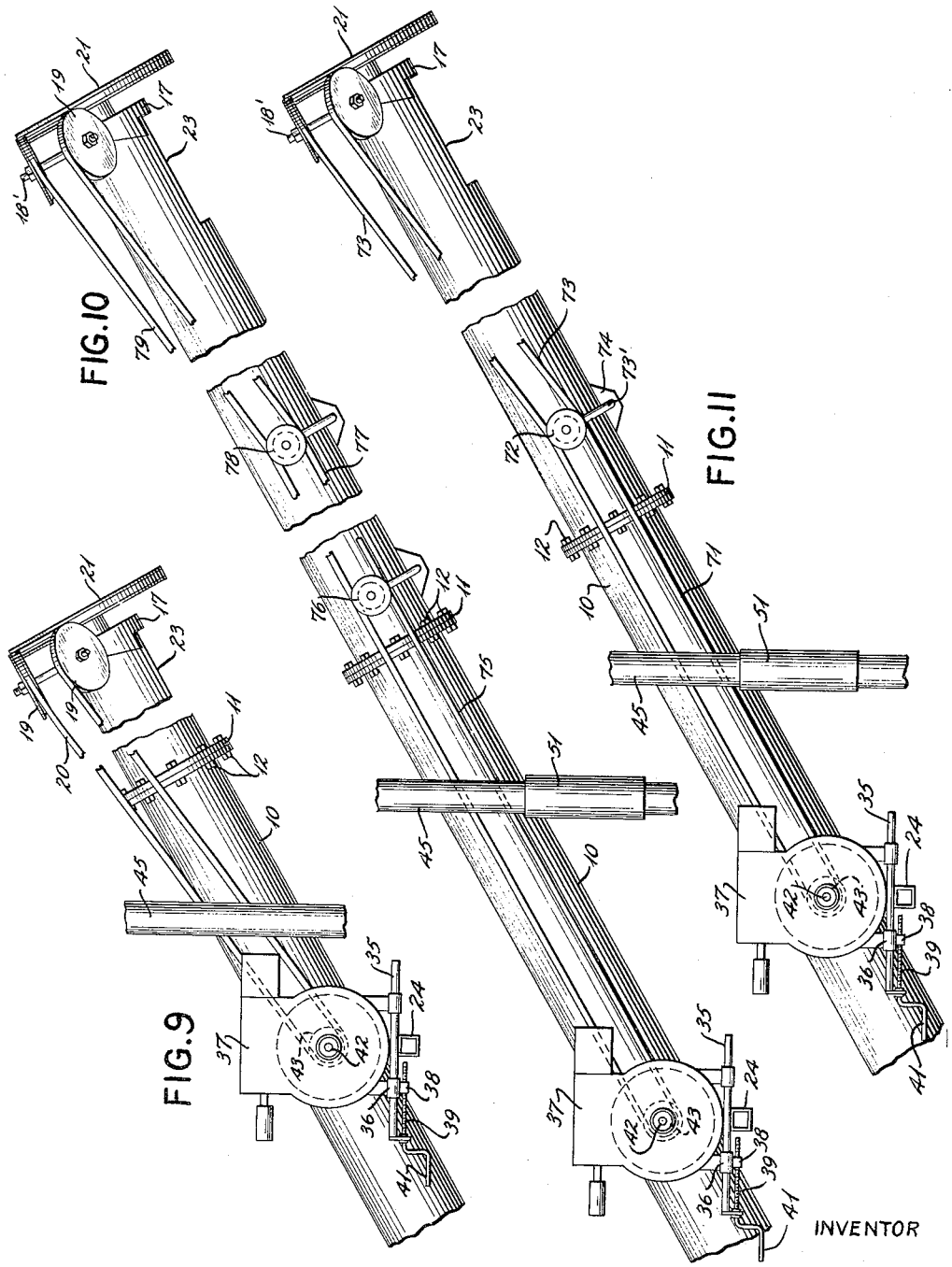
INVENTOR
W.R.Long
BY
ATTORNEY

United States Patent Office 3,023,881
Patented Mar. 6, 1962

3,023,881
GRAIN ELEVATOR
William Redden Long, Tarboro, N.C., assignor to Long Manufacturing Company, Tarboro, N.C.
Filed Aug. 26, 1959, Ser. No. 836,264
4 Claims. (Cl. 198—121)

This invention relates to the handling and storage of commodities of various kinds including natural and manufactured products and also to equipment for the handling and transfer of such commodities from one location to another.

The invention relates particularly to a screw-type elevator or conveyor constructed for use in the movement of grain and other materials from one location to another or from a lower to a higher elevation including from a vehicle to a grain bin or storage structure and with such screw-type conveyor power driven and mounted for height adjustment.

Prior devices employed in the lifting or conveying of commodities have been complicated and expensive, presented problems in the transportation and use of the same, lacked the necessary flexibility in use, were easily rendered inoperative and otherwise were subject to criticism.

It is an object of the invention to provide a power driven screw-type readily mobile elevator or conveyor of simple and inexpensive construction, having few parts and mounted on a carriage-supported mast or post capable of being disposed in an angular lowered position during transportation in order to pass beneath bridges, telephone and telegraph wires, limbs of trees and other objects and for storage, and which can be raised to an upright position when used.

Another object of the invention is to provide an elevator or conveyor on an angularly movable mast or support with a windlass and crank by which it may be raised and lowered, and with a readily detachable and attachable pendulum support for a power plant or motor, mounted in a manner to counter balance the discharge end portion of the conveyor.

A further object of the invention is to provide an elevator or conveyor of the screw type, composed of independent sections which can be shipped unassembled and thereafter assembled on a location and with the ends of such conveyor provided with auxiliary means by which they are supported.

Figure 1:
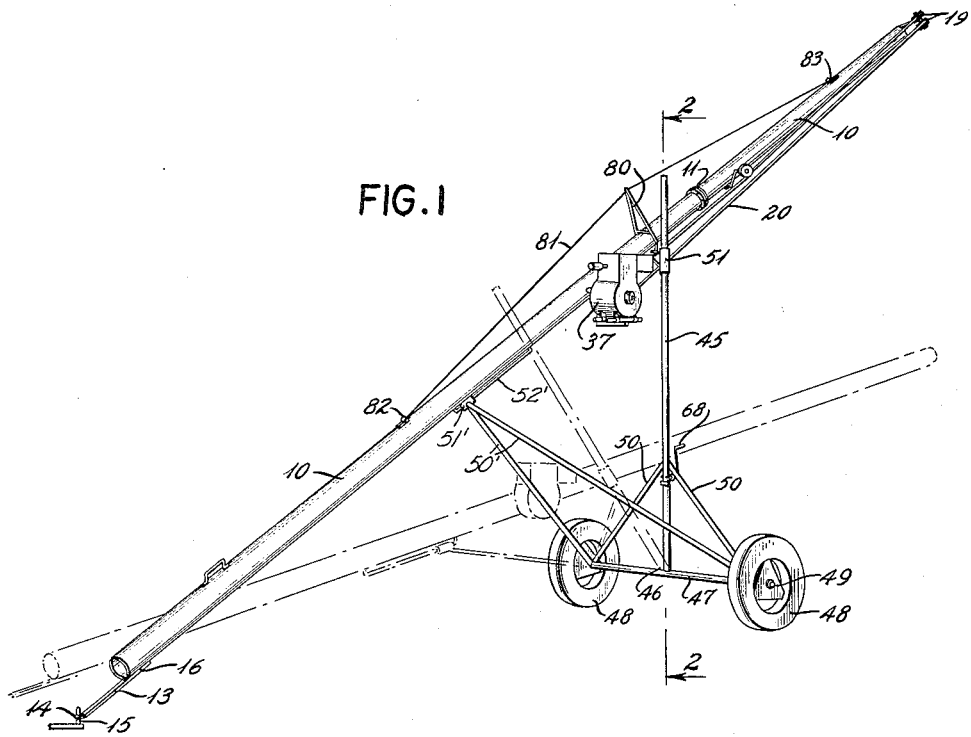
Figures 4, 5:
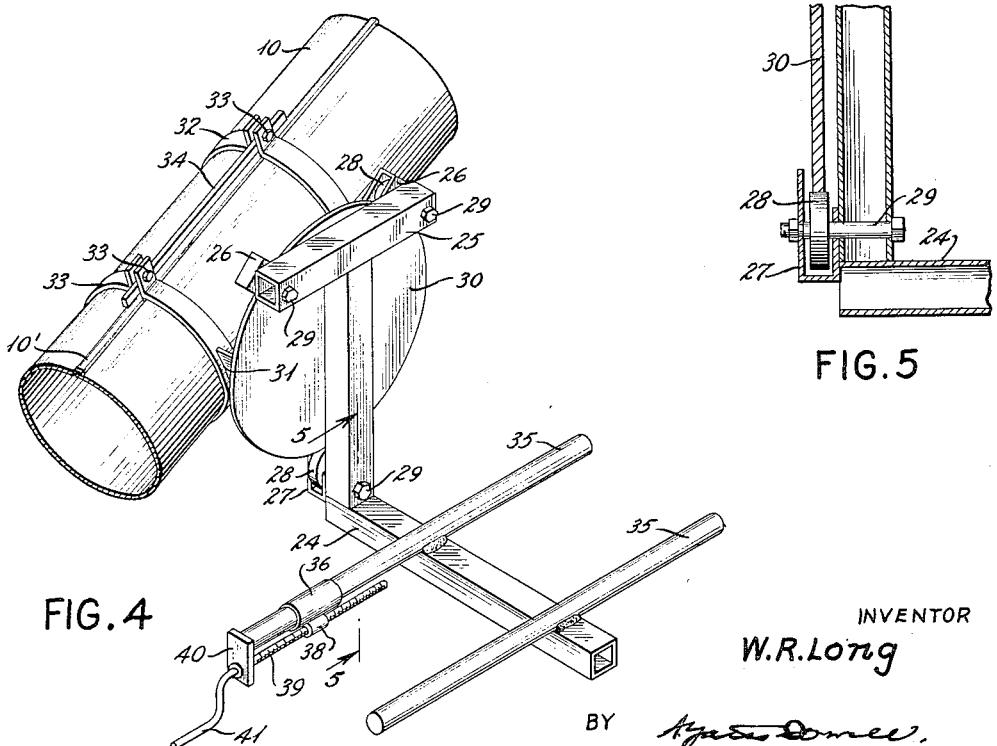
Figure 6:
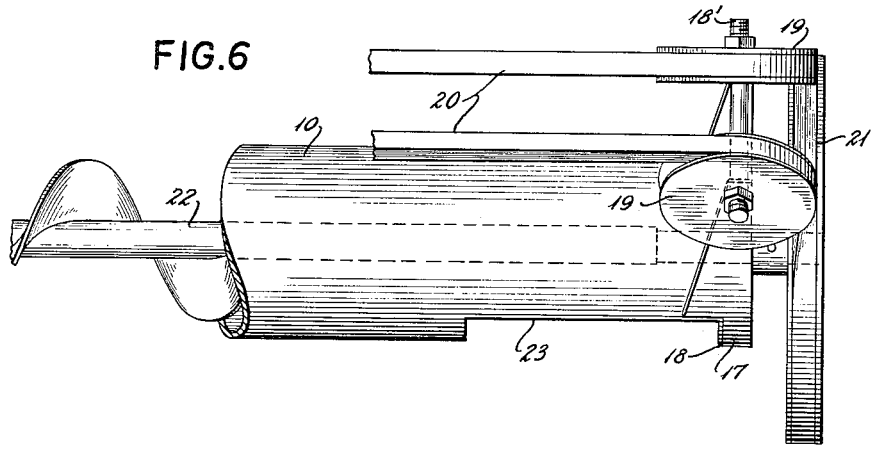
Figure 7:
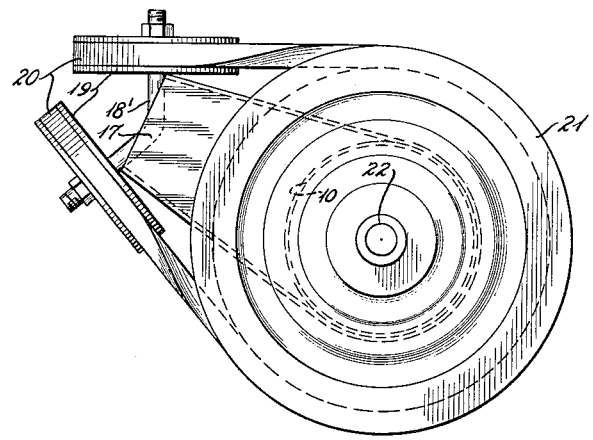
Figure 8:
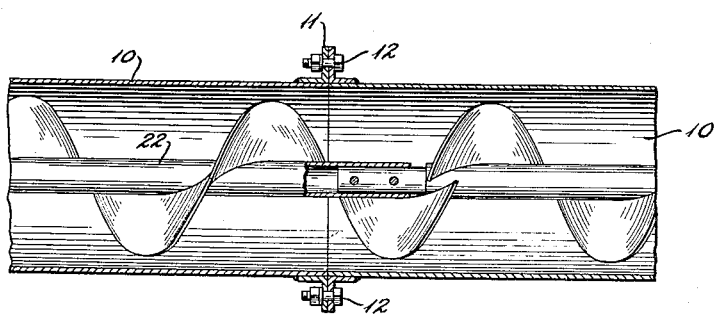

Other objects and advantages of the invention will be apparent from the following description taken in conjunction with the accompanying drawings, wherein:

FIG. 1 is a perspective illustrating one application of the invention;

FIG. 2, a section on the line 2—2 of FIG. 1 illustrating the details of the mast;

FIG. 3, a section on the line 3—3 of FIG. 2;

FIG. 4, a perspective of the motor mount of FIG. 1;

FIG. 5, a detail section on the line 5—5 of FIG. 4;

FIG. 6, a fragmentary side elevation of the discharge end;

FIG. 7, an end elevation of the discharge end;

FIG. 8, a section on the line 8—8 of FIG. 1;

FIG. 9, a fragmentary side elevation of the invention;

FIG. 10, a fragmentary side elevation of a modified form; and

FIG. 11, a fragmentary side elevation of a further modified form.

Briefly stated, the invention is a screw-type elevator or conveyor of single or multiple sections of a pipe or tube and a rotatable screw within the same, such pipe having one end provided with a combination skid and coupling member by which it may be attached to a propelling vehicle. The conveyor is pivotally carried on a mast or post mounted on a carriage or other support, and so constructed to be transported with the mast inclined so that it can pass beneath underpasses, telephone and telegraph wires and cables, as well as the limbs of trees and other low objects, a base slidably connecting the carriage and the pipe or tube for additional support when the mast is in upright position.

The pivotal mounting of the conveyor on the mast or post is by means of a sleeve slidably encircling the mast or post and movable lengthwise thereon by means of a cable and windlass for raising and lowering the conveyor, such windlass including a screw clutch and a ratchet so that when the windlass is rotated such clutch will move along the threads of the screw and against the square ratchet plate and press the same against the shoulder or fixed abutment on the shaft, a pawl being engaged by the square plate to hold the windlass against unwinding, but when the crank is rotated in the reverse direction the pressure on the square plate will be relieved and the tension on the cable will cause reverse rotation of the windlass.

The power plant or prime mover is carried by means of a pendulum support having a pair of hooks or hangers which overhang the upper edge of a mounting disk clamped to the conveyor and with a third hook disposed in opposition to the pair of hooks and adapted to extend through a slot in the mounting disk when the device is applied with the motor rotated slightly from the upright position, thus providing a mount capable of being adjusted angularly to accommodate for any change in the angularity of the conveyor. A motor is mounted on the pendulum support and is adapted by belt means to drive a pulley on a shaft at the discharge end of the conveyor so that the angularity of the motor will not materially affect the drive and the torque of the motor will act to tighten the belt.

With continued reference to the drawings, the elevator or conveyor of the present invention is composed of a heavy gauge pipe 10 which can be readily produced from a strip or ribbon of metal by bringing around the edges and forming a longitudinal seam 10′ similar to the manner in which a conventional length of stove pipe is produced.

The pipe 10 is of one or two sections depending on whether the length is 27, 34 or 40 feet, it being necessary in transportation to limit the sections to under 30 feet. The 34 and 40 foot conveyors are manufactured of two parts or sections with perforated flanges 11 clamped together by bolts 12.

The conveyor at its inlet end is provided with a combination tubular end skid 13 preferably square in cross-section and having an opening 14 for receiving a coupling pin 15, such coupling skid being secured by welding 16 to the pipe 10.

The discharge end of the conveyor (FIG. 6) is provided with an elongated cap 17 secured in any desired manner as by welding 18 across the end of the pipe 10 and with such cap of a length to extend laterally from the pipe and forms a support for an angular bent shaft 18′ and a pair of pulleys 19 about which a V-belt 20 is disposed for driving a pulley 21 on the end of a screw or auger shaft 22 projecting through the cap or header 17. The end of the pipe 10 on its under side adjacent the cap 17 has an opening 23 of a length slightly greater than the diameter of the pipe and of a width substantially equal to the diameter of the pipe through which opening 23 is discharged the grain or other material conveyed.

In order to drive the pulley 21 and the screw 22 to which it is attached an engine or prime mover is mounted on an L-shaped pendulum support 24 having a head 25 with a pair of spaced upright arms or hangers 26 and a single depending diametrically opposed arm or hook 27. Within the members 26 and 27 rollers 28 are mounted by pins 29. The upright arms or hangers 26 and the depending arm or hook 27 are adapted to engage over a mounting disk 30 secured by welding gussets 31 to a clamp 32 composed of half sections and which encircles the pipe 10 and are connected and clamped thereon by means of bolts 33. In order to prevent rotation of the clamp 32 around the pipe 10, a bar 34 is placed between the flanges of the half sections of the clamp and against the seam 10' in such a manner that such bar extends between the flanges of the half sections and is prevented from moving by the seam 10'.

On the horizontal arm of the pendulum motor support 24 are mounted a pair of transverse bars 35 on one of which a sleeve 36 is slidable and to which sleeve the motor 37 is attached. To the sleeve 36 is attached a threaded nut 38 in which a screw 39 is engaged, such screw extending through a bracket 40 attached to the bar 35 and forming a support for the screw 39. On the end of the screw 39 is a crank 41 by means of which the screw may be rotated to move the nut 38 longitudinally of such screw and the parallel shafts 35, thus carrying the sleeve 36 and the motor 37 mounted thereon and adjusting the motor lengthwise of the conveyor.

The motor has a shaft 42 and a pulley 43, the axes of which are disposed diametrically of the conveyor in order that the angularity of the motor will not materially affect the drive and also the torque of the motor will serve to tighten the belt. When the conveyor is only 27 feet long a single V-belt 44 is employed for driving the screw or augers of the conveyor, and when the conveyor is composed of sections totaling 34 feet two such belts, and when 40 plus feet, three such belts will be used.

The conveyor is mounted on a mast or post 45 having its lower end secured by a weld 46 to an axle 47 on which a wheel 48 is fastened by a nut 49 at each end. The axle is connected adjacent the wheels with a pair of braces 50 with ends converging on the mast or post 45 and welded or otherwise fastened thereto.

In order to prevent rotation of the conveyor about the post 45 a second pair of braces 50' have one end of each brace connected to the axle 47 adjacent the wheels 48 and the opposite ends converge on and are pivotally mounted to a sleeve 51' slidably mounted on a bracket 52' mounted on the bottom of the tube 10. As illustrated in FIG. 1 when the conveyor is elevated the sleeve 51' will be located at the lower extremity of the bracket 52' and when the tube is lowered as shown in phantom in FIG. 1 such sleeve will be located at the upper extremity of such bracket. This arrangement permits the angle of elevation of the conveyor to be varied.

Mounted slidably on the post 45 is a sleeve 51 to which is welded or otherwise secured a shaft 52 supported at its outer end by a diagonal bracket 53 fastened by a bolt 54 to the sleeve 51 and with its outer end retained on said shaft 52 by means of a pin 54'. Thus the shaft welded at its inner end and supported by the bracket 53 on its outer end forms a substantial support for a sleeve 55 on which the pipe 10 is mounted by gussets 56. The sleeve 51 is adapted to be raised and lowered on the mast or post 45 by means of a cable 57 having one end attached by a hook 58 welded or otherwise mounted on the sleeve 51. The cable extends upwardly to a pulley 59 mounted at the top of the post by a bolt 59', around such pulley and downwardly to a windlass 60. The windlass is mounted in a U-shaped bracket 61 and attached by a U-bolt 62 welded to such bracket extending through a cross bar 63 to clamp the device about the post 45, a yoke 64 being attached to the upper portion of the bracket 61 to bear against the post 45. The windlass has a shoulder 65 and a reduced threaded portion 66 over which is fitted a square plate 67 adapted to be bound against the shoulder 65 when a crank 68 is rotated in a clockwise direction, a pawl 69 being provided for engaging the square plate to prevent unwinding.

When it is desired to lower the sleeve 51 which carries the pipe 10, the crank 68 is rotated in a counterclockwise direction to relieve the pressure on the square plate 67 and the shoulder 65. The windlass is then free to rotate and the tube will descend by gravity until such time as the cable will tighten the crank 68 against the square plate 67 and the shoulder 65. This operation is repeated until the pipe 10 is at any desired level or until the sleeve 51 is against a stop 70 which is welded or otherwise attached to the mast 45.

When the conveyor is 27 feet long a single V-belt 20 is driven by the motor 37 and drives the pulley 21 and the auger attached thereto. When the conveyor is 34 feet long the motor 37 drives a belt 71 which extends around a double pulley 72 and such pulley drives a belt 73 which drives the pulley 21 and the auger attached thereto. The pulley 72 is rotatably mounted on an arm 73' and such arm is pivotally mounted in a bracket 74 attached to the bottom of the pipe. When the overall length of the conveyor is 40 feet, the motor 37 drives a belt 75 which drives the pulley 76 similar to the pulley 72 and such pulley drives a belt 77 which in turn drives a second double pulley 78 rotatably mounted in a manner similar to the pulleys 72 and 76. The pulley 78 drives a belt 79 which drives a pulley 21 and the auger attached thereto.

As the length of the pipe increases, the motor 37 is mounted further away from the mast 45 to counterbalance the added weight of the extra lengths. In order to add additional strength and to support the outer end of the pipe, a post 80 is mounted on the pipe 10 adjacent the mast and such post is adapted to support a rod 81 having one end secured to an eye 82 on the lower section of the pipe 10 and the opposite end secured to an eye 83 adjacent the discharge end of the pipe.

In the operation of the conveyor the lower end of the pipe is placed in the material to be conveyed and the upper end is positioned above a container into which the material is to be deposited. When the motor is operated an auger or screw type conveyor is rotated to raise the material from the entrance end of the pipe to the discharge end and to deposit such material in a silo, vat or other container.

When the conveyor is transported, the pipe is lowered to its lowermost position and the mast is inclined to the position shown in phantom in FIG. 1 to allow greater road clearances.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A screw conveyor, a combination skid and coupling attached to one end thereof, driving means on the screw of the conveyor at the end of the conveyor opposite said skid, a supporting carriage for said screw conveyor located intermediate the ends thereof, a disk mounted on said conveyor with the plane of the disk upright, a motor suspension structure including hook means adapted to be disposed over the upper and lower portions of said disk, whereby said motor suspension means can be applied and the motor adjusted to an upright position, notwithstanding the slight change in angularity of the conveyor, said motor suspension means including an L-shaped bracket having its upper portion connected to said hook means.

2. The structure of claim 1, having means for elevating the conveyor, said elevating means comprising a windlass, a ratchet plate carried on said windlass and a crank mounted on said windlass and adapted to bear against said ratchet plate.

3. A motor mount support for elevators comprising a support member, a substantially vertically disposed disk connected to said support member, hook means disposed over the upper and lower portions of said disk, and a bracket member secured to said hook means whereby a motor mounted on said bracket will remain in fixed horizontal position notwithstanding vertical movement of the support member.

4. A motor mount support for elevators, comprising a support member, a substantially vertically disposed circular member connected to said support member, hook means disposed over the upper and lower portions of said vertically disposed circular member, and a bracket member secured to said hook means whereby a motor mounted on said bracket will remain in fixed horizontal position notwithstanding vertical movement of the support member.

References Cited in the file of this patent

UNITED STATES PATENTS

| | | | |
|---|---|---|---|
| 2,360,776 | Kozak et al. | Oct. 17, | 1944 |
| 2,395,410 | Kaesler | Feb. 26, | 1946 |
| 2,444,521 | Mulkey et al. | July 6, | 1948 |
| 2,553,488 | Vutz | May 15, | 1951 |
| 2,604,203 | Neighbour et al. | July 22, | 1952 |
| 2,615,560 | Robinson | Oct. 28, | 1952 |
| 2,673,639 | Mayrath | Mar. 30, | 1954 |
| 2,746,592 | Wilcoxen | May 22, | 1956 |
| 2,811,239 | Tintes | Oct. 29, | 1957 |
| 2,831,566 | Beldin et al. | Apr. 22, | 1958 |

FOREIGN PATENTS

| | | | |
|---|---|---|---|
| 160,252 | Australia | Dec. 14, | 1954 |
| 511,973 | Canada | Apr. 19, | 1955 |